United States Patent [19]

Seger et al.

[11] Patent Number: 4,820,038

[45] Date of Patent: Apr. 11, 1989

[54] HYDROGEL CONTACT LENS

[75] Inventors: Ronald G. Seger, Mountain View; Donald O. Mutti, San Jose, both of Calif.

[73] Assignee: CooperVision, Inc., Palo Alto, Calif.

[21] Appl. No.: 896,456

[22] Filed: Aug. 14, 1986

[51] Int. Cl.$^4$ ............................................. G02C 7/04
[52] U.S. Cl. ......................................... 351/160 H
[58] Field of Search ............... 351/160 H, 160 R, 161, 351/162

[56] References Cited

U.S. PATENT DOCUMENTS

| | | | |
|---|---|---|---|
| 3,639,524 | 2/1972 | Seiderman | 260/885 |
| 3,660,545 | 5/1972 | Wichterle | 264/1.6 |
| 3,691,263 | 9/1972 | Stoy et al. | 264/1.6 |
| 3,698,802 | 10/1972 | Baron | 351/160 |
| 3,816,571 | 6/1974 | O'Driscoll et al. | 264/1.6 |
| 3,839,304 | 10/1974 | Hovey | 260/80.72 |
| 3,937,566 | 2/1976 | Townsley | 351/40 |
| 3,937,680 | 2/1976 | deCarle | 260/29.6 |
| 3,943,045 | 3/1976 | Cordrey et al. | 204/159 |
| 3,949,021 | 4/1976 | Kunitomo et al. | 260/895 |
| 3,966,847 | 6/1976 | Seiderman | 260/885 |
| 3,985,697 | 10/1976 | Urbach | 260/29.6 |
| 3,988,274 | 10/1976 | Masuhara et al. | 260/29.7 |
| 4,121,896 | 10/1978 | Shepherd | 425/412 |
| 4,155,962 | 5/1979 | Neefe | 264/1 |
| 4,158,089 | 6/1979 | Loshaek et al. | 526/264 |
| 4,180,308 | 12/1979 | Mancini et al. | 351/160 |
| 4,197,008 | 10/1981 | Woodford | 351/177 |
| 4,198,132 | 4/1980 | Seger et al. | 351/160 H X |
| 4,208,365 | 6/1980 | LeFevre | 264/1 |
| 4,239,353 | 12/1980 | Koller | 351/160 |
| 4,275,183 | 6/1981 | Kuzma | 526/303 |
| 4,276,402 | 6/1981 | Chromecek et al. | 526/264 |
| 4,312,725 | 1/1982 | Loshaek et al. | 204/159 |
| 4,401,372 | 8/1983 | Mancini et al. | 351/160 H |
| 4,430,458 | 2/1984 | Tighe | 523/108 |
| 4,436,887 | 3/1984 | Chromecek et al. | 526/263 |
| 4,440,919 | 4/1984 | Chromecek et al. | 526/263 |
| 4,451,629 | 5/1984 | Tanaka et al. | 526/238 |
| 4,519,681 | 5/1985 | Wichterle | 351/160 H |
| 4,580,882 | 4/1986 | Nuchman et al. | 351/160 H X |

FOREIGN PATENT DOCUMENTS 2426701 12/1975 Fed. Rep. of Germany ... 351/160 H
1548158 7/1979 United Kingdom .

OTHER PUBLICATIONS

"Professional Fitting Guide"-Permaflex (Surfilcon A) Extended-Wear Lenses-CooperVision, Inc.-May 1984.
Permaflex (Surfilcon A)-Hydrophilic Contact Lenses-Aug. 1984 CooperVision, Inc.
Epithelial Erosions Caused by Thin High Water Contact Lenses—Brien A. Holden et al-Clinical & Experimental Optometry 69:3—May 1986, pp. 103-107.
Influence of Wearing Schedule on Extended—Wear Complications—Emily Kenyon et al-Center of Cornea Research, University of California, School of Ophtometry; Opthalmology, vol. 93, No. 2, Feb. 1986—pp. 231-236.

Primary Examiner—John K. Corbin
Assistant Examiner—Scott J. Sugarman
Attorney, Agent, or Firm—Vorys, Sater, Seymour and Pease

[57] ABSTRACT

A high water content hydrogel contact lens with improved oxygen transmission combined with good movement characteristics over the cornea to prevent corneal damage and configured for low minus powers. The lens body has an ultra smooth molded or cast posterior surface with a center thickness in cross-section which is no greater than 0.08 mm and has a small edge-to-edge diameter less than 14.4 mm. With the lens in place on the eye, the eyelid engages a thickened, annular edge of the lens to provide some lens movement on the cornea of about 0.50 mm to assist in the removal of metabolic waste products from behind the lens. The thickened edge is configured to allow the eyelid to smoothly flow over the lens and to maintain good comfort to the wearer of the lens and for these purposes includes a posterior peripheral surface curve to generally conform to the curvature of the sclera of the eye.

50 Claims, 1 Drawing Sheet

HYDROGEL CONTACT LENS

BACKGROUND OF THE INVENTION

The present invention relates to contact lenses and more particularly to soft contact lenses and the design thereof. The invention further relates to lower minus power hydrogel contact lenses.

Contact lenses for correction of ammetropic vision are at present available in a variety of types, styles and materials adapted for correction of most ammetropic conditions. The use of these lenses has presented a number of problems however, because they are worn in intimate contact with the delicate tissues of the cornea of the eye. The special nature of the corneal tissue requires corresponding special considerations in the design, prescription and fitting of these lenses for correction of vision.

The cornea is a nonvascular tissue, because a supply of blood vessels would interfere with the transparency required for proper vision. Yet it is a living tissue and must be provided with oxygen and nutrients, and waste products of metabolism must be removed. To this end the cornea is bathed in a continuously renewed flow of tear fluid which supplies nutrients and removes metabolic wastes. Oxygen dissolves in the tear fluid directly from the atmosphere to which the eye is exposed, and then diffuses from the tears into the corneal tissue. When the eye is closed for long periods, as during sleep, the amount of oxygen reaching the cornea is reduced, but, even then, enough oxygen ordinarily reaches the cornea through the tears to provide for its metabolic needs.

When a contact lens is fitted to the cornea for correcting vision a thin film of tear fluid remains between the lens and the cornea. However, this thin layer of tears is no longer exposed to the atmosphere for direct absorption of oxygen. Hence some provision must be made for supplying oxygen to the cornea beneath the contact lens either by exchange of the layer between the lens and cornea with fresh, oxygenated fluid or by making the lens permeable to oxygen. Similarly, removal of waste products requires exchange of the tear layer between the lens and the cornea with fresh tear fluid. In practice, the cornea can survive for some time without adequate oxygen supply or waste removal. Accordingly, hard, oxygen-impermeable contact lenses made, e.g., of poly(methyl methacrylate) can be used, provided they are worn somewhat less than normal waking hours. Although the cornea can recover partially during the period in which the lens is not worn, short term and long term chronic changes have been reported. Furthermore, some exchange of tear fluid is possible with such lenses due to the generally random movement of the lens over the surface of the cornea as it is pushed to and fro by the eyelids during blinking. This mechanism for exchange of tear fluid is effective especially when lenses of relatively small diameter are fitted which cover only the central portion of the cornea.

In order to increase patient acceptance, oxygen-permeable hydrogel contact lenses have been developed. These lenses, which are made of a water-swollen synthetic resin, allow at least some oxygen to diffuse through the body of the lens to oxygenate the tear film underneath and thereby to supply oxygen to the cornea upon which they rest. This additional supply of oxygen permits soft hydrogel lenses to be worn for longer periods of time than the hard contact lenses. However, thicker hydrogel lenses containing modest amounts of water, e.g., 25% to 59% by weight of the total weight of the hydrated lens, do not transmit enough oxygen to provide all the needs of the cornea, especially when the eyelids are closed. Accordingly, these lenses also must be removed during periods of sleep. The soft lenses also do not permit the diffusion of metabolic products, and therefore the removal of these products depends on the exchange of tear fluid produced by movement of the lens. Because soft lenses are designed to cover the entire cornea and because they tend to fit the corneal contour rather snugly, some consideration must be given to the shape of the lens if it is to have adequate movement to produce adequate exchange of tear fluid.

In order to permit essentially continuous or extended wear of contact lenses (so that the lenses can be worn during sleeping hours as well as waking hours over long periods of time), thinner, lower water-content and thicker, higher water content (the proportion of water may range from 60% to 90% by weight of the lens) lenses have been developed. Such lenses transmit sufficient oxygen by diffusion to supply the needs of the corneas when the eyes are open, although they supply marginal amounts of oxygen when the eyelids are closed. These lenses, however, rely on lens movement with consequent exchange of tear fluid to remove the corneal metabolic products. In addition, the great flexibility of current extended wear hydrogel lenses results in a close corneal fit and greater difficulty in movement by motion of the eyelids. Consequently, removal of metabolic wastes remains a problem with extended wear lenses. Furthermore, even though the extended wear lens designs differ for low and high water content lenses, the oxygen transmissibility among lens types does not vary significantly ($\pm 15\%$) from one type lens to another. These lenses, in fact, transmit insufficient oxygen with consequent corneal hypoxia and build up of metabolic waste. These problems of inadequate oxygen transmission and poor movement have prevented the fulfillment of the promise of extended wear without metabolic complications in all existing hydrogel contact lenses, particularly those of the low minus-power type which are commonly prescribed for correction of the very common condition of slight to moderate myopia. Indeed, the relatively high frequency of corneal changes such as epithelial microcysts, corneal thinning, and occasional corneal ulcers associated with extended-wear contact lenses, and thought to be due to hypoxia has been described in Kenyon et al., "Influence of Wearing Schedle on Extended-Wear Complications", Ophthalmology 1986; 93:231-6. Lower water content contact lenses are presently optimized with respect to maximum oxygen transmission and cannot be improved upon utilizing existing technology. On the other hand, if the high water-content lenses are made thin enough to provide adequate oxygen to meet the metabolic needs of the cornea, other complications, such as epithelial erosions are observed. These effects are reported in Holden et al., "Epithelial Erosions Caused by Thin High Water Content Lenses", Clinical and Experimental Optometry 69.3: May 1986-p. 103–107, who suggest that they may be due to inadequate movement of the very thin high water-contact lenses and dessication of the cornea due to a very thin post-lens tear film.

Thus, contrary to thinking early in the development of soft contact lenses, problems in daily wear and extended wear lenses have recently been recognized.

These problems include the effective disposal of metabolic wastes, anatomical alterations, and physiological alterations. The solution has been to design lenses having greater oxygen transmissibility characteristics by increasing the water content of the lens and/or by decreasing their thicknesses. Therefor, current extended wear lenses of low minus powers (−2.00 diopters) are known each with about equal oxygen transmissibility capabilities. For example, lower water content (35-45%) lenses typically have a center thickness of 0.03 mm; medium water content (45-59%) lenses typically have a center thickness of 0.05 mm; and high water content (60-90%) lenses typically have a center thickness of 0.15 mm. As discussed above, thinner lenses of any water content have not been successful due to their fragility, poor handling characteristics, inadequate metabolic debris and waste removal, and the fact that they cause corneal damage.

Accordingly, a need has continued to exist for a high water-content hydrogel contact lens which combines adequate oxygen transmission with good movement over the cornea to prevent corneal damage, to remove metabolic debris and waste, which handles well and is not too fragile.

OBJECTS OF THE INVENTION

Accordingly, it is the principal object of the present invention to provide an improved lower minus power soft contact lens design.

Another object of the present invention is to provide an improved hydrogel contact lens which transmits higher levels of oxygen.

A further object of the present invention is to provide an improved hydrogel high water content contact lens which reduces and possibly eliminates disturbances to the corneal epithelium.

A still further object of the present invention is to provide an improved high-water contact lens which reduces the incidence of corneal injury.

Another object is to provide a novel contact lens design providing adequate lens movement relative to the cornea to prevent accumulation of metabolic waste behind the lens.

A further object is to provide an improved hydrogel contact lens having excellent handling characteristics.

A still further object is to provide a high water content contact lens which is strong yet flexible so that when stretched it will not tear and will recover its original shape without distortion of the optical quality.

Another further object is to provide an improved lower minus power, high water content lens which is comfortable for the user to wear.

Other objects and advantages of the present invention will become more apparent to those persons having ordinary skill in the art to which the present invention pertains from the following description taken in conjunction with the accompanying drawing.

BRIEF DESCRIPTION OF THE DRAWING

The drawing is a cross-sectional view of a hydrogel contact lens according to the present invention.

DETAILED DESCRIPTION OF THE PREFERRED EMBODIMENTS

Figure 1:
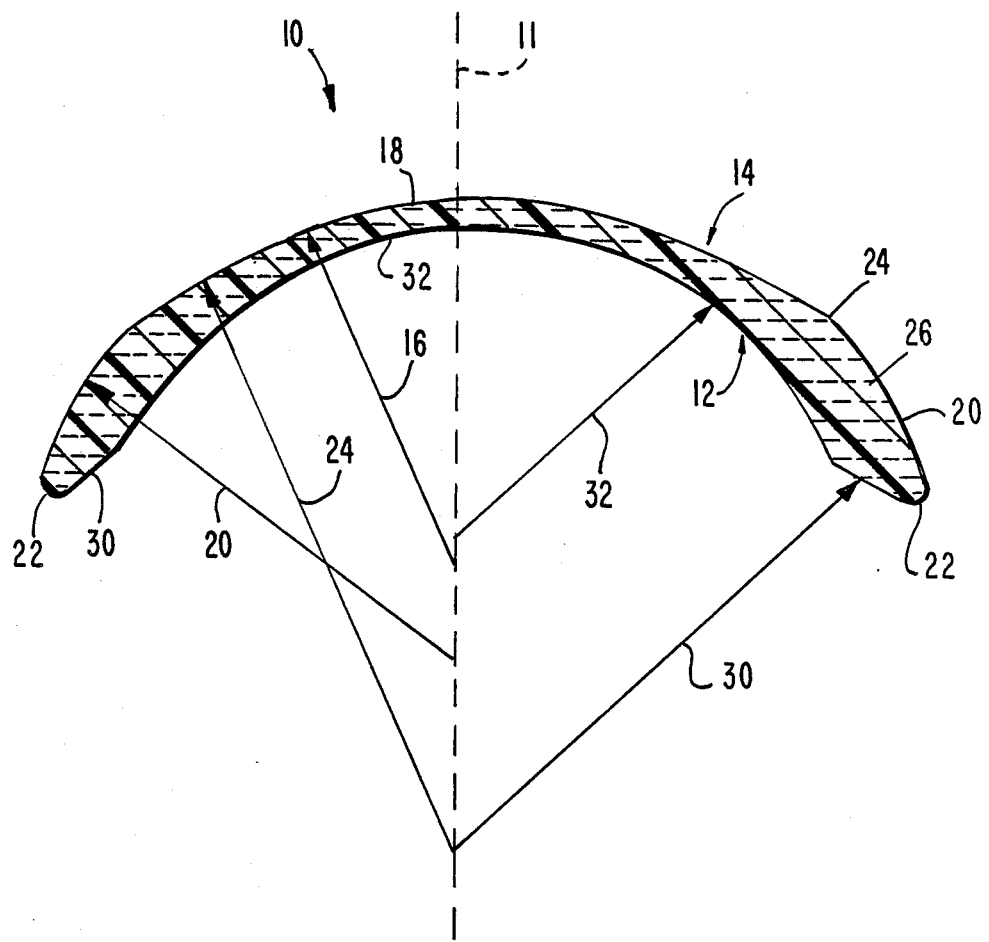

Referring to the drawing, there is illustrated generally at 10 a soft contact lens embodying the present invention, shown in its cross section, and having its axis of rotation shown at 11. Lens 10 is formed of hydrogel material having a higher water content on the order of 50% or 60% to 90% and is able to transmit high levels of oxygen. Lens 10 is further designed for low minus powers of −0.50 to −5.00 diopters.

The hydrogel material used in the contact lens of this invention may be any hydrophilic synthetic or natural (collagen) polymer capable of absorbing enough water to form a hydrogel containing at least 50% or 60% by weight of water. Such materials are well known to those skilled in the art and generally comprise copolymers of hydroxyethyl acrylate or hydroxyethyl methacrylate with N-vinylpyrrolidone crosslinked with a suitable proportion of a bifunctional polymerizable monomer such as disclosed in Seiderman U.S. Pat. No. 3,966,847; copolymers of hydroxethyl methacrylate, N-vinylpyrrolidone and an unsaturated organic acid such as acrylic acid, crosslinked by a bifunctional polymerizable monomer such as ethylene glycol dimethacrylate as disclosed in de Carle, U.S. Pat. No. 3,937,680; lightly crosslinked copolymers of hydroxyethyl methacrylate and methacrylic acid as disclosed in Urbach, U.S. Pat. No. 3,985,697; copolymers of acrylamide, N-vinyl pyrrolidone, methyl methacrylate and methacrylic acid as disclosed in Tighe et al., U.S. Pat. No. 4,430,458; and the like.

Lens 10 has an inner or posterior surface illustrated generally at 12 configured to fit over the anterior surface of the eye. Posterior surface 12 can have any suitable shape such as bicurve, monocurve or aspheric. The opposite anterior surface 14 is formed by a center curve 16 covering the optical zone 18, a peripheral curve 20 engaging the periphery 22 of contact lens 10 and a smooth transition curve 24 joining center curve 16 and peripheral curve 20. Peripheral curve 20 forms an annular raised rim or thickened bead 26 for the lens to provide an engaging surface for the eyelid so that the lens can have adequate movement on the eye, but still allowing the eyelid to smoothly flow over the lens. This degree of movement allows for the removal of metabolic waste from behind the lens. When movement is inadequate, debris from metabolism accumulates behind the contact lens and becomes toxic to the cornea. With high myopic lenses, bead 26 extends for a greater portion of the radius of the lens 10. The total diameter of lens 10 will also be less than is frequently used. It will be 12.5 to 14.5 mm, and more particularly 12.8 to 14.3 mm, or less than 14.0 mm, with preferred diameters being 13.5 mm and 13.9 mm. It has been noted that less resistance to movement is provided for this smaller lens than for larger ones thereby also assisting in the movement of debris.

Posterior surface 12 of the lens is preferably formed by casting since this provides for a smoother surface than surfaces formed by lathing. Lathed and polished surfaces are believed to cause more damage to the corneal epithelium because the surface of the resulting contact lens is rougher compared to molded surfaces. Molds of the Shepherd type such as are illustrated in U.S. Pat. No. 4,121,896 can be used, or as discussed in PCT/US84/00742. Similarly, spin cast and base-cast front lathed lenses can be used such as are disclosed in U.S. Pat. Nos. 3,691,263 and 4,155,962.

At the outer edge of posterior surface 12 a back secondary curve 30 is formed. Curve 30 provides a better match between posterior surface 12 of the contact lens and the eye; it thereby defines a peripheral fitting curve. Curve 30 joins opposite ends of base curve 32 of the optical zone; base curve 32 is curved to conform to the curved surface of the cornea. Secondary curve 30 has a longer radius than base curve 32 similar to the way in which the sclera has a longer radius than the cornea. In the preferred embodiment, peripheral curve 20 will be parallel to base curve 32 for a short distance, which allows for a thinner edge and smooth flow of the eyelid over the contact lens. Curve 30 determines how lens 10 moves and the thickness of bead 26 and is important for lens control and comfort. Curve 30 will have a radius shorter than larger lenses and will be 8.5 to 9.5 mm. The length of curve 30 will also be shorter than larger lenses and would be about 1.10 mm. Base curve 32 should have a 7.0 to 9.0 mm radius range and a preferred range within that would be 7.5 mm to 8.6 mm, or 7.7 to 8.3 mm, and more particularly 7.7 to 8.0 mm, or 7.8 to 8.1 mm.

As earlier stated, the water content range will be about 50% or 60% to 90%, and the center thickness will be no greater than 0.08 mm. This thin center portion enables lens 10 to have sufficiently high oxygen transmission characteristics to facilitate extended wear. For a 60% water content, the center thickness would be about 0.03 mm, and for a 75% water content the thickness will be about or less than 0.08 mm.

The peripheral thickness of bead 26 will be sufficient so that the eyelid pushes lens 10 providing adequate lens movement and good handling characteristics and so that the lens has enough rigidity for proper centration, ensuring that the lens is not distorted. It typically would have a thickness of 0.20 to 0.28 mm and preferably would be 0.24 mm thick. The width of bead 26 can be less than 1.0 mm, but it is also within the scope of the present invention to have a width of 1.0 to 1.5 mm in order to get additional lens movement. Also, the diameter of the anterior optical zone 18 can be greater than 7.0 mm and lens 10 can be all optical zone until a thickness of 0.24 mm. Realistically though, the diameter of anterior optical zone 18 should not exceed 10.5 mm. The posterior optical zone diameter is a fitting curve unrelated to the anterior optical zone diameter. It is basically defined by the average diameter of the cornea and overall lens diameter.

A first sample lens 10 according to the present invention having −2.50 diopter power and a 65% water content would have a center thickness of 0.05 mm, and its optic zone would have a diameter of 8.5 mm, a thickness at the diameter of 0.105 mm., and would cover 28.5°. The transition angle would have a width of about 15° and a radius of 9.6 mm. At the edge of the transition zone, it would reach a peripheral thickness of 0.22 mm. For a −0.50 diopter power lens, the thickness would be the same but the junction thickness would be about 0.060 mm. In the latter case, the transition angle would be about the same but the radius would be about 9.91 mm. and it would reach the same peripheral thickness.

A second sample lens 10 according to the present invention having −2.50 diopter power and a 74% water content would have a center thickness of 0.08 mm, and its optic zone would have a diameter of 8.5 mm and a thickness at the diameter of 0.14 mm. The transition angle would have a radius of 8.2 mm. At the edge of the transition zone, it would reach a peripheral thickness of 0.24 mm. For a −0.50 diopter power lens, the thickness would be the same but the junction thickness would be about 0.09 mm. In the latter case, the transition angle would be about the same, but the radius would be about 8.4 mm and it would reach the same peripheral thickness.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. A soft contact lens comprising:
   a body hydrogel lens material having a water content at least 60% of total weight,
   said body having a low minus power configuration of −0.50 to −5.00 diopters,
   said body having an anterior surface, a posterior surface, an anterior central optical zone, a peripheral edge, and a peripheral zone generally between said optical zone and said peripheral edge,
   said posterior surface being formed by molding, cast-molding or spin casting said material to the desired surface shape with an ultra-smooth surface finish,
   said posterior surface being defined by a base curve in said posterior optical zone and a posterior secondary curve generally adjacent said peripheral edge.
   said body having a diameter less than 14.5 mm,
   said body having a center thickness in cross section no greater than 0.08 mm,
   said peripheral zone having a thickness in cross section greater than said center thickness of said body,
   said peripheral zone defining an annular lens rim enlarged from the surface of said anterior surface, and
   said rim having a thickness sufficient so that the eyelid pushes said body on the surface of the eye and so that said body is not distorted and has enough rigidity for proper centration.
2. The lens of claim I including,
   said peripheral zone of said posterior surface being concave.
3. The lens of claim 1 including,
   said posterior surface being formed by molding said material to said desired surface shape with said ultra-smooth surface finish.
4. The lens of claim 1 including,
   said posterior surface being formed by cast molding said material to said desired surface shape with said ultrasmooth surface finish.
5. The lens of claim 1 including,
   said posterior surface being formed by spin casting said material to said desired surface shape with said ultrasmooth surface finish.
6. The lens of claim 1 including,
   said anterior surface being formed by molding, cast molding, spin casting or polishing said material to the desired surface shape.
7. The lens of claim 1 including,
   said body having a diameter of 12.5 to 14.5 mm.
8. The lens of claim 1 including,
   said peripheral zone having a thickness no greater than
9. The lens of claim 1 including,
   said body having a posterior surface with a base curve of 7.0 to 9.0 mm in said posterior optical zone.
10. The lens of claim 1 including,
    said posterior surface having a bicurve shape.
11. The lens of claim 1 including,
    said posterior surface having a monocurve shape.

12. The lens of claim 1 including,
said posterior surface having an aspheric shape.

13. The lens of claim 1 including,
said anterior surface including a central optical curve in said optical zone, a peripheral curve adjacent said peripheral edge, and a smooth transition curve between and joining said central optical curve and said peripheral curve.

14. The lens of claim 1 including,
said anterior optical zone having a diameter less than 10.5 mm.

15. The lens of claim 14 including,
said anterior optical zone having a diameter between 7.0 mm and including 8.5 mm.

16. The lens of claim 1 including,
said peripheral zone having a width of less than 1.0 mm.

17. The lens of claim 1 including,
said peripheral zone having a width of 1.0 to 1.5 mm.

18. The lens of claim I including,
said base curve smoothly and directly adjoining said secondary curve.

19. The lens of claim 1 including,
said secondary curve having a longer radius than said base curve.

20. The lens of claim 1 including,
said base being configured to fit on the cornea and said secondary curve being configured to fit on the sclera.

21. The lens of claim 1 including,
said anterior surface including a central optical curve, a peripheral curve parallel to said secondary curve, and a transition curve joining said central optical curve and said peripheral curve.

22. The lens of claim 1 including,
said transition curve having its desired curvature being independent on the lens power and anterior optical zone diameter of said body.

23. The lens of claim I including,
said water content being 71%.

24. The lens of claim 1 including,
said water content being 74%.

25. The lens of claim 1 including,
said center thickness being 0.03 mm.

26. The lens of claim 1 including,
said body diameter being less than 14.4 mm.

27. The lens of claim 1 including,
said body diameter being 12.5 to 14.5 mm.

28. The lens of claim 1 including,
said body diameter being 12.8 to 14.3 mm.

29. The lens of claim 1 including,
said body diameter being 13.5 mm.

30. The lens of claim 1 including,
said body diameter being 13.9 mm.

31. The lens of claim 1 including,
said water content being 60%, and
said center thickness being 0.04 mm.

32. A soft contact lens comprising:
a body of hydrogel lens material having a water content at least 60% of total weight,
said body having a low minus power configuration,
said body having an anterior surface, a posterior surface, an anterior central optical zone, a peripheral edge, and a peripheral zone generally between said optical zone and said peripheral edge,
said posterior surface being formed by molding said material to the desired surface shape with an ultra-smooth surface finish,
said posterior surface being defined by a base curve in said posterior optical zone and a posterior secondary curve generally adjacent said peripheral edge,
said body having a diameter less than 14.5 mm,
said body having a center thickness in cross section no greater than about 0.08 mm, and
said peripheral zone defining an annular lens rim enlarged from the surface of said anterior surface, and having a thickness of 0.20 to 0.28 mm.

33. The lens of claim 32 including,
said low minus power being −0.50 to −5.00 diopters.

34. The lens of claim 32 including,
said peripheral zone of said posterior surface being concave.

35. The lens of claim 32 including,
said anterior surface being formed by cast molding said material to the desired surface shape.

36. The lens of claim 32 including,
said anterior surface including a central optical curve in said optical zone, a peripheral curve adjacent said peripheral edge, and a smooth transition curve between and adjoining said central optical curve and said peripheral curve.

37. The lens of claim 32 including,
said anterior optical zone having a diameter less than 10.5 mm.

38. The lens of claim 32 including,
said peripheral zone having a width of less than 1.0 mm.

39. The lens of claim 32 including,
said base curve smoothly and directly adjoining said secondary curve.

40. The lens of claim 32 including,
said secondary curve having a longer radius than said base curve.

41. The lens of claim 32 including,
said base curve being configured to fit on the cornea and said secondary curve being configured to fit on the sclera of the eye.

42. The lens of claim 32 including,
said anterior surface including a central optical curve, a peripheral curve parallel to said secondary curve, and a transition curve joining central optical curve and said peripheral curve.

43. The lens of claim 32 including,
said transition curve having its desired curvature being dependent on the lens power and the anterior optical zone diameter of said body.

44. The lens of claim 32 including,
said water content being 71%.

45. The lens of claim 32 including,
said water content being 74%.

46. The lens of claim 32 including,
said center thickness being 0.04 mm.

47. The lens of claim 32 including,
said center thickness being less than 0.08 mm.

48. The lens of claim 32 including,
said rim thickness being 0.24 mm.

49. The lens of claim 32 including,
said water content being at least 65%.

50. The lens of claim 32 including,
said molding of said posterior surface being by cast molding.

* * * * *